J. B. PRICE.
TIRE.
APPLICATION FILED APR. 14, 1911.
1,007,889.
Patented Nov. 7, 1911.
3 SHEETS—SHEET 1.
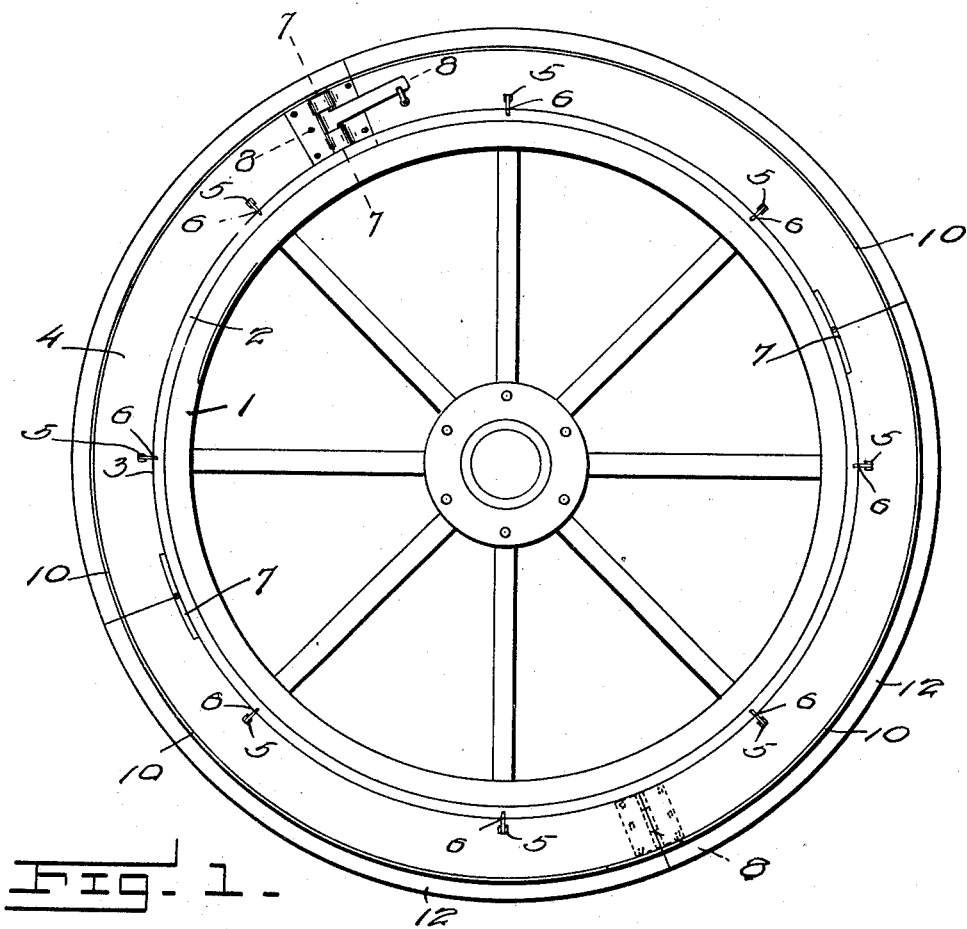
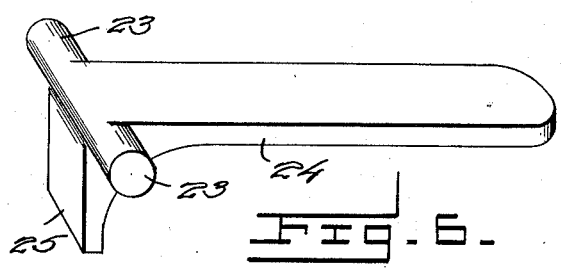
Witnesses
Inventor
J. B. Price,
By Harry Ellis Chandlee
Attorney J. B. PRICE.
TIRE.
APPLICATION FILED APR. 14, 1911.
1,007,889.
Patented Nov. 7, 1911.
3 SHEETS—SHEET 2.
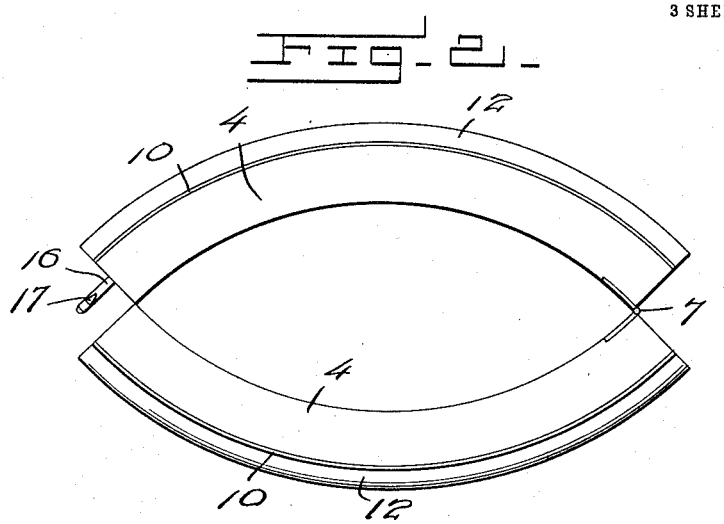
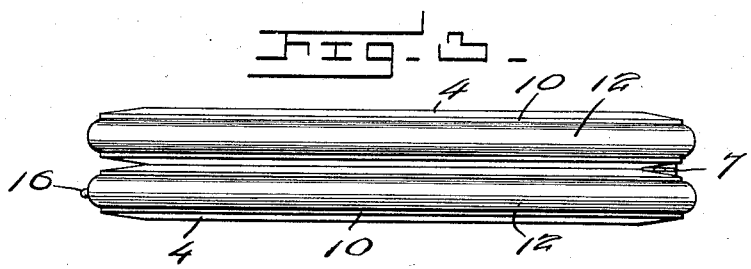
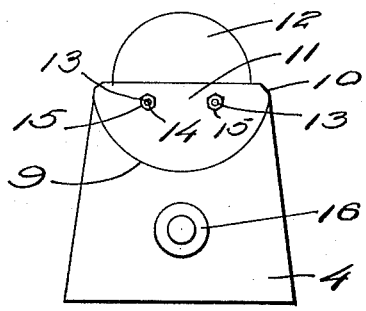
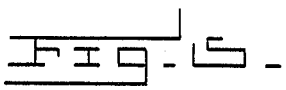
Witnesses
Inventor
J. B. Price,
By Harry Ellis Chandlee,
Attorney J. B. PRICE.
TIRE.
APPLICATION FILED APR. 14, 1911.
1,007,889.
Patented Nov. 7, 1911.
3 SHEETS—SHEET 3.
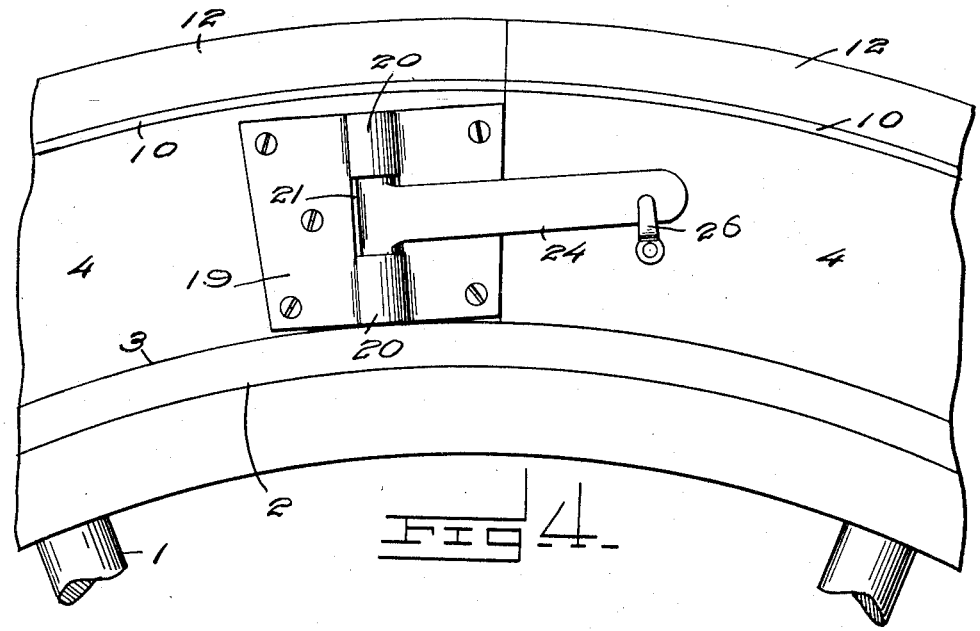
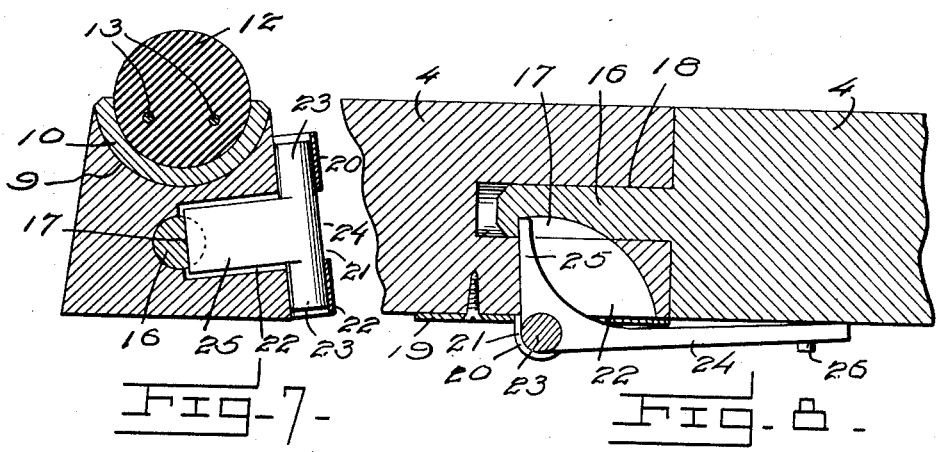
Inventor
J. B. Price,
Witnesses
R. L. Armstrong.
M. L. Neal,
By Harry Ellis Chandlee
Attorney
COLUMBIA PLANOGRAPH CO., WASHINGTON, D. C.

UNITED STATES PATENT OFFICE.

JAMES BAIN PRICE, OF BEAUMONT, TEXAS.

TIRE.

1,007,889.   Specification of Letters Patent.   Patented Nov. 7, 1911.

Application filed April 14, 1911. Serial No. 621,021.

*To all whom it may concern:*

Be it known that I, JAMES B. PRICE, a citizen of the United States, residing at Beaumont, in the county of Jefferson and State of Texas, have invented certain new and useful Improvements in Tires, of which the following is a specification.

My invention relates to improvements in tires, and has for its leading object the provision of an improved form of sectional cushion for tires adapted to be secured upon an automobile wheel to temporarily take the place of the usual pneumatic tire when said pneumatic tire has been punctured or otherwise injured.

A further object of my invention is the provision of an improved cushioned tire which may be readily folded up and packed in small space and can be thus easily carried within an automobile and which may be quickly and easily secured on the wheel rim without the necessity of employing any especial tool.

Another object of my invention is the provision of improved means for securing the cushioning portion of the tire in position on the various sections, whereby said cushioning portions will be firmly retained in position on their respective sections.

Other objects and advantages of my improved tire will be apparent from the following description taken in connection with the accompanying drawings, and it will be understood that I may make any modifications shown and described within the scope of my claims without departing or exceeding the spirit of the invention.

Figure 1 represents a side elevation of a wheel equipped with my improved tire. Fig. 2 represents a side elevation of a tire in folded position. Fig. 3 represents a plan view thereof. Fig. 4 represents an enlarged side elevation of the two interlocking ends of the tire. Fig. 5 represents an end view of one of said sections. Fig. 6 represents a perspective view of the locking member. Fig. 7 represents a sectional view on the line 7—7 of Fig. 1, and Fig. 8 represents a sectional view on the line 8—8 of Fig. 1.

In the drawings, the numeral 1 designates a wheel having the usual tire engaging metallic rim 2 with an upstanding flange 3, while mounted upon said wheel is my improved tire. Said tire comprises a base section preferably formed of wood, said base section 4 resting upon the metallic rim 2 and having passing therethrough the bolts 5 having pivoted to their ends the hook members 6 which engage the flange 3 and thus serve to lock the tire in position upon the wheel rim.

The base section 4 of my tire is made in a plurality of sections, in the drawings I have illustrated as composed of four sections, two of said sections being secured together to two of the other sections by hinges 7 which are secured to the base of the sections 4 while the two semi-circular members thus formed have secured to their sides at one end the hinges 8, to fold my tire into compact position it being merely necessary to first double the two semicircles together on the hinge 8 and then swing the semicircles on their hinges 7 when the tire will assume the position shown in Fig. 2.

Each section of the base 4 has formed in its outer face the groove or channel 9 in which is secured the curved metallic plate 10 having at each end the integral end plate 11 which lies flush with the end face of the base section. Mounted in the channel of the plate 10 is the tire proper 12 of suitable cushioned material, preferably resilient rubber, while passing through the tire proper 12 are the rods 13 having their ends engaged in the apertures 14 of the end plates 11, nuts 15 being screwed on to the end of the various rods of each tire section 12, and the tightening of the nuts tensing the rods and thus firmly securing the cushioned tire portion 12 in position on the outer face or rim of each section of my tire.

To removably connect the free ends of the detachable repair tire, I secure in one of the end sections thereof, the rod or tube 16 having a portion projecting from the section and provided with a shouldered recess 17, said rod being adapted to fit in the socket 18 of the other end section of my tire. Secured to said lateral end section is a metallic plate 19 having the offset portion 20 with a central slot 21 formed therein, while formed in the side of the portion 4 of the end section below said plate 19 is a recess 22, the recess 17 of the rod 16 lying in the recess 22 of the other section when the two ends of the tire are together.

Fitting against the under faces of the offsets 20 of the plate 19 are the spindle lugs 23 of the locking member 24, said lever projecting outward through the slot 21 and having an L-shaped end 25 which fits within the recess 22. When the two ends of the tire are forced manually together as tightly as possible, I then press downward the lever 24, causing its end 25 to engage the shoulder of the recess 17 and thus to cammingly force the rod 16 inward in the socket 18 and draw the tire more tightly around the wheel rim, a latch member 26 being secured to the rod bearing sections to engage the end of the lever 24 and hold the same in depressed position to lock the tire on the rim.

From the foregoing description taken in connection with the drawings the construction and use of my improved foldable repair tire will be readily understood, and it will be seen that I have provided an improved tire of this character which may be easily folded or secured in position upon the rim of a wheel, and in which the cushioned tires of the various sections are secured in position in a novel and improved manner.

I claim:

1. A tire, comprising a plurality of base sections, hinges connecting certain of said sections, a resilient tread member secured to each of the sections, a recessed lug projecting from the free end of one of the base sections, and means carried by the free end of the adjacent base section for engaging the recessed lug to draw it and thus its base section tightly against the end of the adjacent base section.

2. The combination with a sectional tire for automobiles, of means for connecting the ends of said tire, said means comprising a rod secured to one end of the tire member and having a recess formed therein, the other end of the tire having a socket and an enlarged communicating recess formed in it, a plate secured to the tire and covering the recess, said plate having a pair of offsets formed therein separated by a slot, and a locking lever having pintles engaged in the offsets projecting from the plate through the slot therein, said locking member having an end lying in the recess and adapted to fit in the recess of the rod to force the rod inward in the socket, and means for locking the lever in position to retain the rod in the socket.

In testimony whereof I affix my signature, in the presence of two witnesses.

JAMES BAIN PRICE.

Witnesses:
J. R. EDMONDS,
E. B. McGHEE.

---

Copies of this patent may be obtained for five cents each, by addressing the "Commissioner of Patents, Washington, D. C."